United States Patent
Crum et al.

(10) Patent No.: US 9,256,544 B2
(45) Date of Patent: Feb. 9, 2016

(54) WAY PREPARATION FOR ACCESSING A CACHE

(71) Applicants: Matthew M. Crum, Austin, TX (US); Teik-Chung Tan, Austin, TX (US)

(72) Inventors: Matthew M. Crum, Austin, TX (US); Teik-Chung Tan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 108 days.

(21) Appl. No.: 13/726,825

(22) Filed: Dec. 26, 2012

(65) Prior Publication Data

US 2014/0181407 A1    Jun. 26, 2014

(51) Int. Cl.
    *G06F 12/08*    (2006.01)
    *G06F 1/32*    (2006.01)

(52) U.S. Cl.
    CPC .......... *G06F 12/0895* (2013.01); *G06F 1/3275* (2013.01); *Y02B 60/1225* (2013.01); *Y02B 60/1228* (2013.01)

(58) Field of Classification Search
    CPC . G06F 12/08; G06F 12/0844; G06F 12/0888; G06F 12/0895; G06F 1/3275
    USPC ......... 711/118, 122, 128, 129, 133, 137, 144, 711/E12.018, E12.075; 712/E9.047
    See application file for complete search history.

(56) References Cited

U.S. PATENT DOCUMENTS

| | | | | |
|---|---|---|---|---|
| 5,860,104 A | * | 1/1999 | Witt et al. | 711/137 |
| 6,016,533 A | * | 1/2000 | Tran | 711/128 |
| 6,021,461 A | * | 2/2000 | Dhong et al. | 711/105 |
| 6,425,055 B1 | * | 7/2002 | Sager et al. | 711/118 |
| 2002/0161976 A1 | * | 10/2002 | Ito et al. | 711/128 |
| 2006/0041722 A1 | * | 2/2006 | Hakura et al. | 711/137 |
| 2006/0095680 A1 | * | 5/2006 | Park et al. | 711/137 |
| 2008/0052467 A1 | * | 2/2008 | Thompson | 711/128 |
| 2008/0052470 A1 | * | 2/2008 | Agaram et al. | 711/137 |
| 2008/0082753 A1 | * | 4/2008 | Licht et al. | 711/128 |
| 2009/0031082 A1 | * | 1/2009 | Ford et al. | 711/128 |
| 2009/0198900 A1 | * | 8/2009 | Knoth | 711/128 |
| 2012/0110266 A1 | * | 5/2012 | Wilkerson | G06F 1/3203 711/122 |
| 2012/0290780 A1 | * | 11/2012 | Kinter et al. | 711/104 |

OTHER PUBLICATIONS

Xu et al, "Fast Way-Prediction Instruction Cache for Energy Efficiency and High Performance", IEEE Networking Architecture and Storage 2009, Jul. 9-11, 2009, pp. 235-238.*

* cited by examiner

*Primary Examiner* — Tuan Thai
*Assistant Examiner* — Kamal Dewan (57) ABSTRACT

For a memory access at a processor, only a subset (less than all) of the ways of a cache associated with a memory address is prepared for access. The subset of ways is selected based on stored information indicating, for each memory access, which corresponding way of the cache was accessed. The subset of ways is selected and preparation of the subset of ways is initiated prior to the final determination as to which individual cache way in the subset is to be accessed.

25 Claims, 5 Drawing Sheets

WAY PREPARATION FOR ACCESSING A CACHE

BACKGROUND

1. Field of the Disclosure

The present disclosure generally relates to processor caches, and more particularly to preparation of cache ways for access.

2. Description of the Related Art

A processor typically employs a cache to store data likely to be accessed in the near future. In order for the processor to access the cache's stored data, the storage elements of the cache must be in an accessible state. For example, in some caches the stored data can only be read when bitlines of the storage elements being accessed have been precharged to a particular voltage. Maintaining the storage elements of the cache in the accessible state consumes power. Accordingly, one technique for managing access to a cache involves maintaining the cache's storage elements in a low power state and, in response to an access request, transitioning the storage elements to be accessed to the accessible state. However, because it takes time to transition the storage elements, this technique can increase access latency.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-5 illustrate techniques for reducing power consumption for a memory access at a processor by preparing for access only a subset (less than all) of the ways of a cache associated with a memory address. The subset of ways is selected based on stored information indicating, for each memory access, which corresponding way of the cache was accessed. The subset of ways is selected and preparation of the subset of ways is initiated prior to the final determination as to which individual cache way in the subset is to be accessed. Accordingly, only a subset of ways is prepared for access, thereby reducing power consumption.

Figure 1:
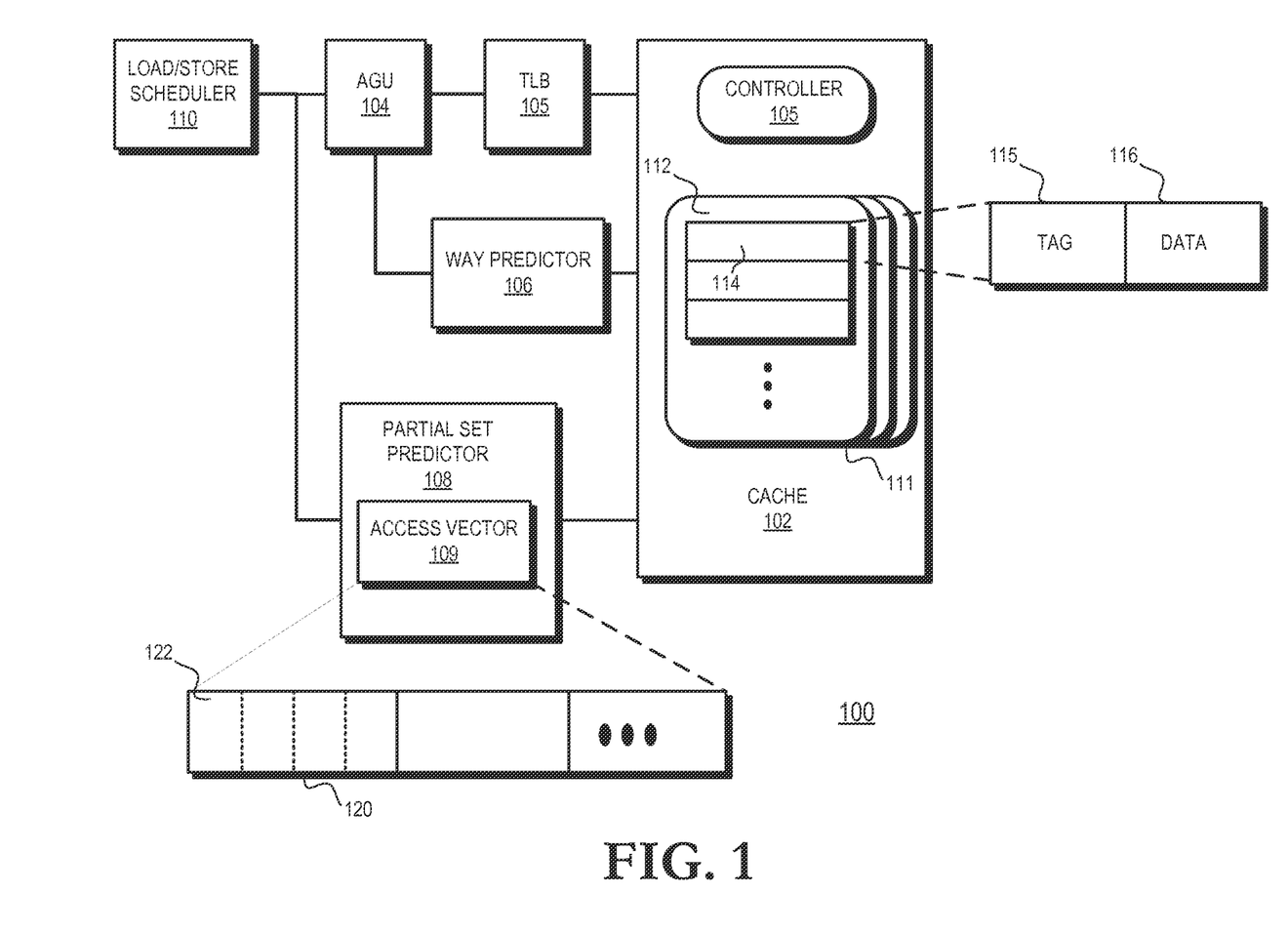
FIG. 1 is a block diagram of a processor in accordance with some embodiments.

To illustrate, the processor includes an address generation unit to generate a memory address based on memory address components, whereby the memory address indicates an individual cache way to be accessed by the memory request. The processor also includes a way predictor to predict, based on the memory address, which of the cache ways will be the individual cache way that is accessed. The processor prepares the predicted cache way for access by, for example, precharging the bit lines for the cache way that stores a tag identifier. The processor further includes a partial set predictor to record access information indicating, for each memory access, which cache way was accessed. Based on the access information, the partial set predictor can determine the predicted subset of cache ways prior to the way predictor determining the predicted way to access. This allows the cache to prepare only a subset of ways of the cache for access, rather than preparing all the ways that are potentially associated with a memory address, thus reducing power consumption at the cache.

FIG. 1 illustrates a block diagram of a processor 100 in accordance with some embodiments. The processor 100 can be part of an electronic device, such as a personal computer, server, personal or hand-held electronic device, telephone, and the like. The processor 100 is generally configured to execute sets of instructions, referred to as computer programs, stored at an external memory (not shown). The execution of sets of instructions by the processor 100 primarily involves the storage, retrieval, and manipulation of information, including instructions and data. The processor core 100 can include, for example, a central processing unit (CPU) core, a graphics processing unit (GPU) core, or a combination thereof. The memory 150 can be volatile memory, such as random access memory (RAM), non-volatile memory, such as flash memory, a disk drive, or any combination thereof.

To execute the instructions, the processor 100 includes an instruction pipeline having a load/store scheduler 110. The instruction pipeline can include other stages (not shown), such as a fetch stage to fetch instructions, a decode stage to decode the fetched instructions into sets of micro-operations, execution units to execute the micro-operations, and a retire stage to manage retirement of the instructions from the instruction pipeline. The load/store scheduler 110 represents one or more units whose functions include scheduling the calculation of addresses for load and store operations and subsequently scheduling those operations to access the data cache. A load operation represents a request to retrieve data from a memory location, while a store operation represents a request to store data at a memory location. Load operations and store operations are collectively referred to herein as "memory access requests." Each memory access request is associated with a corresponding address, referred to as a memory address, indicating the memory location to be accessed by the associated operation. In some embodiments, the memory address is a logical address representing the memory location from the perspective of the computer program that generated the memory access request.

A memory access request is initiated by the load/store scheduler 110 receiving address information for a load/store instruction. In order to allow a computer program to efficiently manage the transfer and manipulation of data, the address information does not include the memory address itself, but includes information, referred to as memory address components, that can be used to generate the memory address. For example, the received address information can include a base address value, an offset address value, and a displacement value. The memory address can be calculated by combining the memory address components in a particular way, such as by adding them together.

The processor 100 includes a cache 102 to satisfy memory access requests. The cache 102 is an N-way set associative cache having a controller 105 and storage array 111. The storage array 111 is logically arranged into a plurality of sets, such as set 112, with each set having N ways, such as way 114, where N is an integer. Each of the sets is associated with a different corresponding subset of memory addresses. Each of the ways includes a tag field 115 and a data field 116. The tag field 115 stores a tag value indicative of the memory address of the data stored at the field 116. In particular, each memory address can be segmented into a number of fields, with one field indicating an index value of the memory address and another field indicating the tag value of the memory address. The index value of the memory address indicates the set of the cache 102 that can store data associated with the memory address. The tag value identifies the individual way of the set that stores the data. In some embodiments, any of the ways of a set can store data for any memory address having the set's index value. Accordingly, the tag field of a way indicates the memory address of the data stored at the way. In some embodiments, the tag field is based on a physical address of its associated way.

Each of the tag fields and data fields of the ways of the cache 102 are composed of storage elements that store individual bits of the respective field. The storage elements can be selectively placed by the controller 105 in at least two different states: a low-power state and an accessible state. In the low-power state, the storage elements retain their stored data but the stored data cannot be accessed in the low-power state. In the accessible state, the data stored at the storage elements can be accessed. As used herein, accessing a way refers to retrieving data from a way or storing data at the way.

Because the storage elements consume less power in the low-power state than in the accessible state, the controller 105 maintains the storage elements of a way in the low-power state until it determines the way is to be, or is likely to be, accessed, when it transitions the storage elements from the low-power state to the accessible state. The transitioning of a storage element from the low-power state to the accessible state is referred to herein as preparing the storage element for access. Preparing the storage element for access can involve a number of operations, such as precharging the bit lines or write lines of the storage element to a particular voltage, driving a word line in each of the tag and data arrays, and the like. In some embodiments, the states of the storage elements for the tag field 115 can be set independent of the states for the data field 116. Thus, for example, the storage elements of the tag field 115 can be prepared for access while the storage elements of the data field 116 are maintained in the low-power state. This allows the controller 105 to determine if a data field is to be accessed by comparing the value at the tag field to a portion of a received memory address without preparing the entire way for access, thereby reducing power consumption.

The processor 100 reduces power consumption by determining three different values based on the address components of a memory access and preparing different subsets of the ways of the cache 102 for access based on the different address values. To illustrate, the processor 100 includes an address generation unit (AGU) 104, a translation look-aside buffer (TLB) 105, a way predictor 106, and a partial set predictor 108. The partial set predictor 108 is configured to receive the memory address components of a memory access from the load/store scheduler 110, logically combine a portion of each of the address components to determine a value referred to as a partial memory hash, and determine a subset of the ways of the cache 102 that are predicted to include the way targeted by the memory access. As used herein, a partial set of the ways refers to more than one, but fewer than all, of the ways in the set that is targeted by the memory access operation. To illustrate, in some embodiments each set of the cache 102 includes 8 ways numbered 0-3 and 4-7, and the partial set predictor 108 generates, for each memory access, a prediction as to whether the way to be accessed is in the first half (ways 0-3) or the second half (ways 4-7) of the set to be accessed.

To predict which subset of ways is to be accessed, the partial set predictor 108 includes an access vector 109 having a number of fields, such as field 120, whereby each field is associated with a different corresponding set of the cache 102. Each of the fields of the access vector 109 includes a number of sub-fields, such as sub-field 122, whereby each of the sub-fields is associated with a different subset of ways of the set corresponding to the field. For example, each field of the access vector 109 includes two sub-fields, with one of the sub-fields associated with one subset of the ways of the corresponding set and the other of the sub-fields associated with a different subset of the ways of the corresponding set. Each of the sub-fields stores a value indicating the predicted likelihood that an access to the corresponding set will be an access to the corresponding subset of ways. It will be appreciated that, while the illustrated example includes two sub-fields for two corresponding subsets, each field of the access vector can include up to N sub-fields, where N is the number of ways.

As described further herein, the partial set predictor 108 monitors accesses to the ways of the cache 102 and updates the values at each of the subfields to modify the predicted likelihoods that the corresponding subset of ways is to be accessed. For example, in some embodiments the partial set predictor 108 can determine that a given subset of the ways of a given set have been accessed more often than the other subsets of the ways of the given set. Accordingly, the partial set predictor 108 can set the value of the sub-field of the access vector 109 corresponding to the given subset to a higher value than the sub-field corresponding to the second half of the ways. The partial set predictor 108 thereby indicates a prediction that the first half is more likely to be accessed in response to the next memory access to the given set.

The AGU 104 is configured to receive the memory address components from the load/store scheduler 110 and combine the memory address components to determine the memory address for the memory access operation. In some embodiments, the AGU 104 combines the components by performing a full addition of the memory address components. The TLB 105 stores a set of physical addresses whereby each physical address is associated with a set of ways of the cache 102. The TLB 105 receives the combined address components from the AGU 104, determines the physical address of the way associated with the combined address components, and provides the physical address to the cache 102. The cache 102 compares a portion of the physical address to the tag fields of the associated set of ways to determine if any of the ways in the set is associated with the memory address. Accordingly, the physical address determined by the TLB 105 is the address used by the cache 102 to determine the particular way to be accessed by a memory access.

The way predictor 106 is configured to determine an address for a predicted way from the combined memory address components generated by the AGU 104 and determine an address for a predicted way. In some embodiments, the way predictor 106 determines the address by logically combining (hashing) one or more portions of the combined memory address components. As described further herein, the combining of the address components by the way predictor 106 takes a longer amount of time than the combining of the address components by the partial set predictor 108, but less time than the determination of the physical address by the TLB 105. Accordingly, the partial set prediction of the partial set predictor 108 is ready for use before the way prediction by the way predictor 106, and the way prediction is ready prior to the determination of the physical address by the TLB 105.

Figure 2:
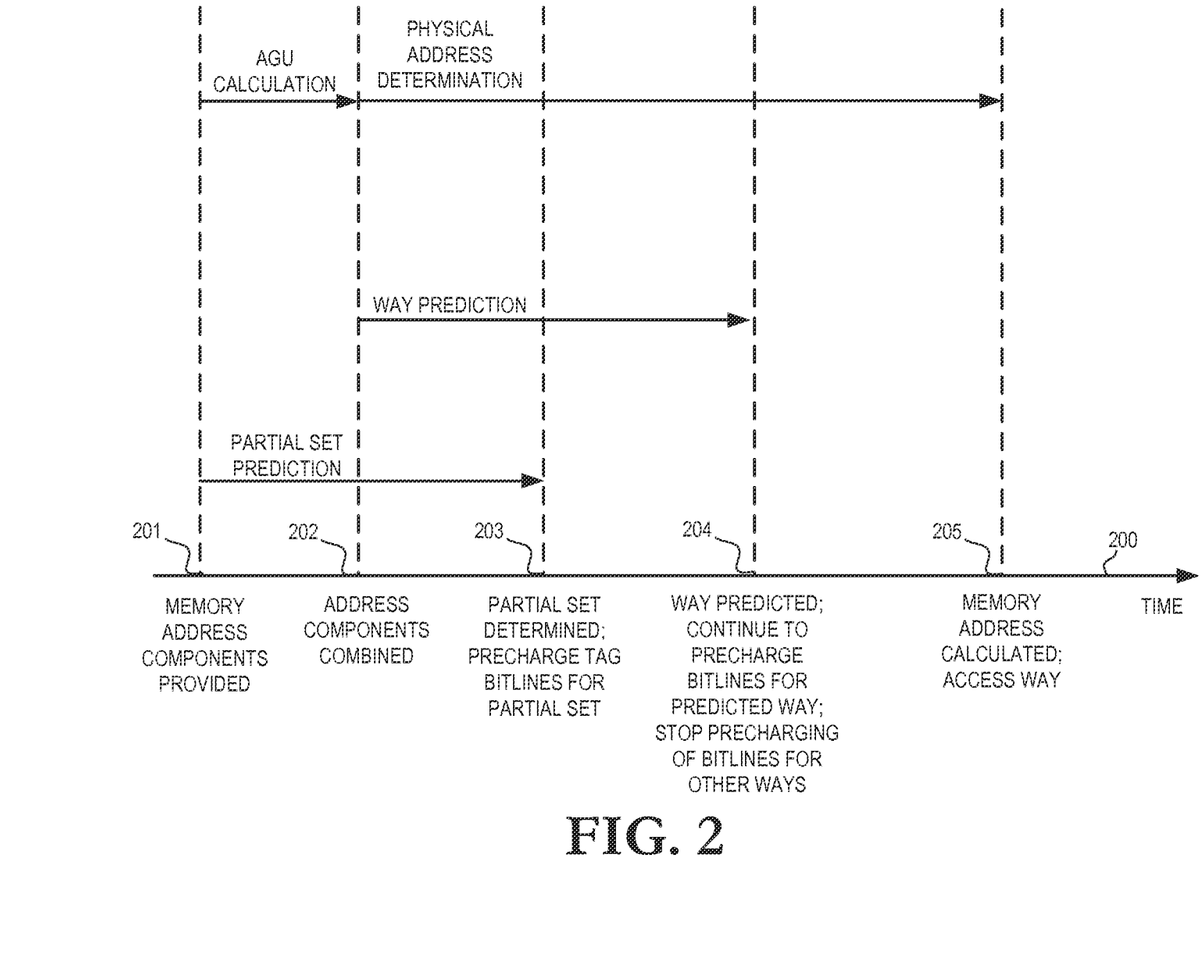
FIG. 2 is a diagram illustrating an example of preparing a way of a cache for access in accordance with some embodiments.

The controller 105 of the cache 102 uses the partial set prediction generated by the partial set predictor 108 and the way prediction generated by the way predictor 106 to prepare ways of the cache 102 for access. The controller 105 then uses the physical address determined by the TLB 105 to access the way targeted by the memory access. This can be better understood with reference to FIG. 2, which illustrates an example memory access in accordance with some embodiments. FIG. 2 depicts a timeline 200 showing the timing of events at the processor 100. At time 201, the load/store scheduler 110 receives the memory address components for a memory access. This initiates determination of the predicted partial set at the partial set predictor 108 and initiates determination of the memory address at the AGU 104. At time 202 the AGU 104 completes combining the memory address components. Accordingly, the TLB 105 commences determination of the physical address and the way predictor 106 initiates prediction of the way to be accessed.

At time 203 the partial set predictor 108 completes generation of the partial set prediction and provides the prediction to the controller 105. In response, the controller 105 prepares to access the storage elements of the tag field of the subset of ways indicated by the partial set prediction. For example, the controller 105 initiates precharging of the bitlines for the storage elements of the tag field. At time 204, the way predictor 106 completes generation of the predicted way and provides information indicating the predicted way to the controller 105. In response, the controller 105 determines if the predicted way is in the subset indicated by the partial set prediction. If the predicted way is in the subset indicated by the partial set prediction, the controller 105 continues transitioning the storage elements of the predicted way (those storage elements that store the data for the predicted way) to the accessible state. Further, the controller 105 stops preparing for access the storage elements of the other ways (the ways not predicted to be accessed by the predicted way), thereby conserving power. For example, the controller 105 can stop the precharging of bitlines for the storage elements of the other ways.

At time 205, the TLB 105 completes computation of the physical address. In response, the controller 105 determines if the physical address corresponds to the predicted way. If the controller 105 determines that the physical address corresponds to the predicted way, the controller 105 waits until the predicted way is ready for access and then completes the access to the way. After access is complete, the controller 105 returns the way to the low-power state. Accordingly, in the example of FIG. 2, if the way corresponding to the memory address is in the subset of ways indicated by the partial set prediction, preparation of the way is initiated at time 202, concurrent with calculation of the memory address.

Accordingly, in the example of FIG. 2, the partial predictor 108 allows for only a subset of the ways of the cache 102 and their associated tag fields to be prepared for access, rather than all of the ways in a set. In conventional processors, the prediction of the particular way to be accessed by the memory access can come late, requiring all of the tag fields in a set of ways to be prepared for access to prevent a delay in the memory access. By allowing for only a subset of the tag fields to be prepared, the partial set predictor 108 reduces power consumption.

Figure 3:
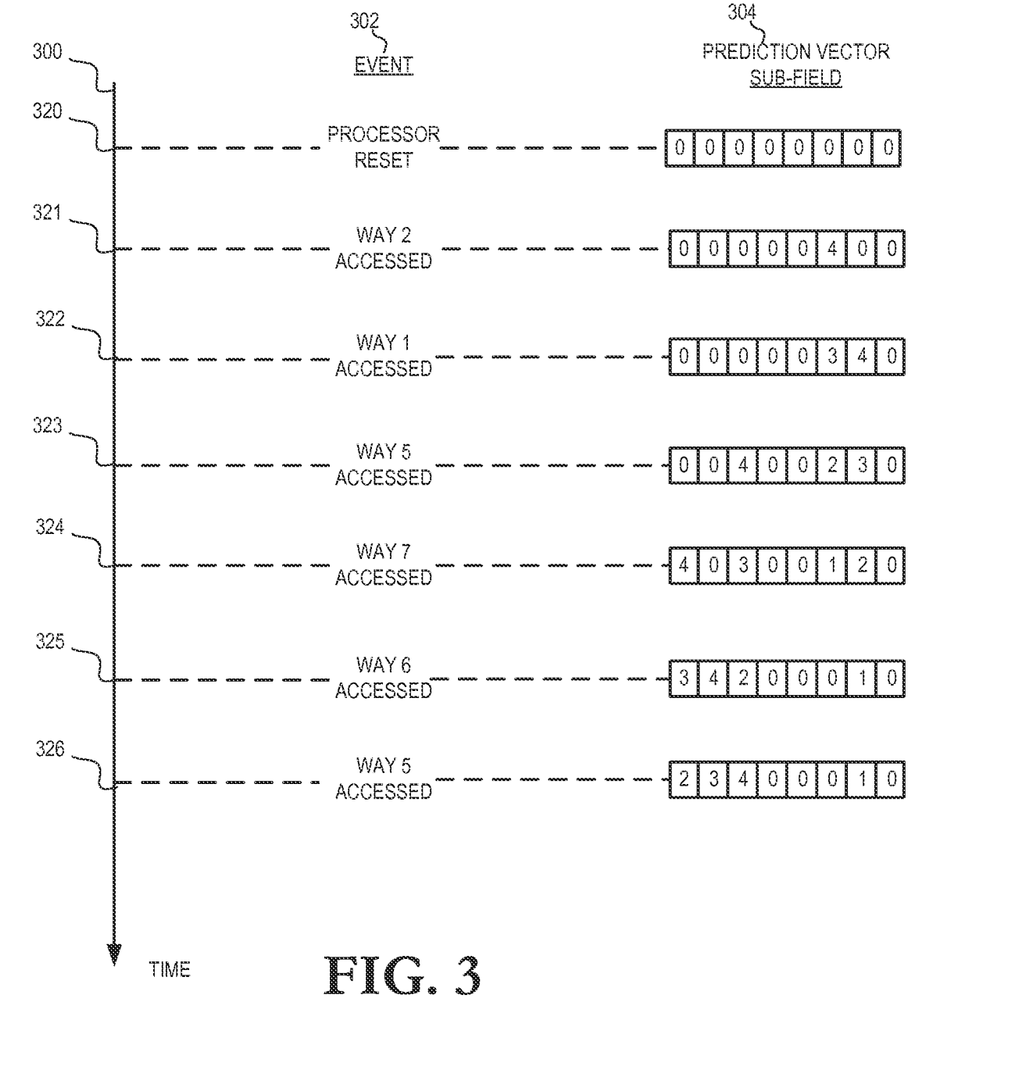
FIG. 3 is a diagram illustrating an example of adjusting a partial set vector of FIG. 1 in accordance with some embodiments.

FIG. 3 illustrates an example of determining the values of sub-fields of the access vector 109 (FIG. 1) in accordance with some embodiments. FIG. 3 illustrates a timeline 300 showing the timing of a set of events 302 and the corresponding set of statuses 304 of 8 sub-fields of the access vector 109. In the illustrated example it is assumed that each sub-field stores a value associated with the corresponding way of a set at the cache 102. It is further assumed that the partial set predictor 108 will predict that the subset of ways having positive values stored at their respective sub-fields is the subset of ways to be accessed.

To illustrate, at time 320 the processor 102 undergoes a reset. Accordingly, the values at the sub-fields are each reset to zero. At time 321 the partial set predictor 108 receives an indication that way 2 of the set has been accessed. In response, the partial set predictor 108 sets the value of the associated sub-field to 4.

At time 322 the partial set predictor 108 receives an indication that way 1 of the set has been accessed. In response, the partial set predictor 108 sets the value of the associated sub-field to 4 and reduces the value of the sub-field associated with way 2 to 3. The sub-field having the highest value of four thus indicates the most recently accessed way, with successively lower value sub-fields indicating less recently accessed ways. At time 323, the partial set predictor 108 receives an indication that way 5 of the set has been accessed. In response, the partial set predictor 108 sets the value of the sub-field associated with way 5 to 4 and reduces the values of the sub-fields for way 1 and way 2 to 3 and 2 respectively. At time 324, the partial set predictor 108 receives an indication that way 7 of the set has been accessed. In response, the partial set predictor 108 sets the value of the sub-field associated with way 7 to 4 and reduces the values of the sub-fields for way 5, way 1, and way 2 to 3, 2, and 1 respectively.

Because a threshold number (in the illustrated example, four) sub-fields have positive values, in response to receiving address components indicating the set of the cache 102 associated with the access vector 109 is to be accessed, the partial set predictor 108 initiates preparation of the ways having sub-fields storing positive values: ways 7, 5, 1, and 2. In some embodiments a selected subset of the ways can have their sub-fields initialized to a particular value, allowing the partial set predictor 108 to more quickly begin predictions of the partial set to be accessed.

At time 325 the partial set predictor 108 receives an indication that way 6 of the set has been accessed. In response, the partial set predictor 108 sets the value of the sub-field for way 6 to 4, and reduces the values at the sub-fields for ways 7, 5, 1, and 2 to 3, 2, 1, and 0 respectively. Because the value for way 2 has been reduced to 0, it will not be prepared for access in response to the partial set predictor 108 receiving address components indicating that the set of ways is to be accessed. At time 326 the partial set predictor 108 receives an indication that way 5 of the set has been accessed. In response, the partial set predictor 108 returns the value of the sub-field for way 5 to 4, and reduces the values at the sub-fields for ways 6 and 7 to 3 and 2 respectively. In addition, the partial set predictor 108 determines that if it were to reduce the value of the sub-field for way 1 to 0, fewer than the threshold number of ways would be prepared in response to receiving the requisite address components. Accordingly, the partial set predictor 108 maintains the value of the sub-field for way 1 at the value of 1. The partial set predictor 108 thus maintains the threshold number of ways to be available for preparation for a memory access.

It will be appreciated that FIG. 3 is an example of the access vector 109, and that other access vectors and techniques for adjusting the values at the access vector can be used. Thus in some embodiments, for a cache having associativity of W ways per set, the access vector 109 can have N sub-fields, where N can range from W (such that access vector 109 has one-sub-field per way) to 2 (such that access vector 109 has one sub-field for each half of each set). Each sub-field can have 1 or more bits to indicate the value of the sub-field. In some embodiments, the subset of ways does not depend on the ways that were accessed immediately preceding a given memory access, but instead depends on other prediction schemes.

Figure 4:
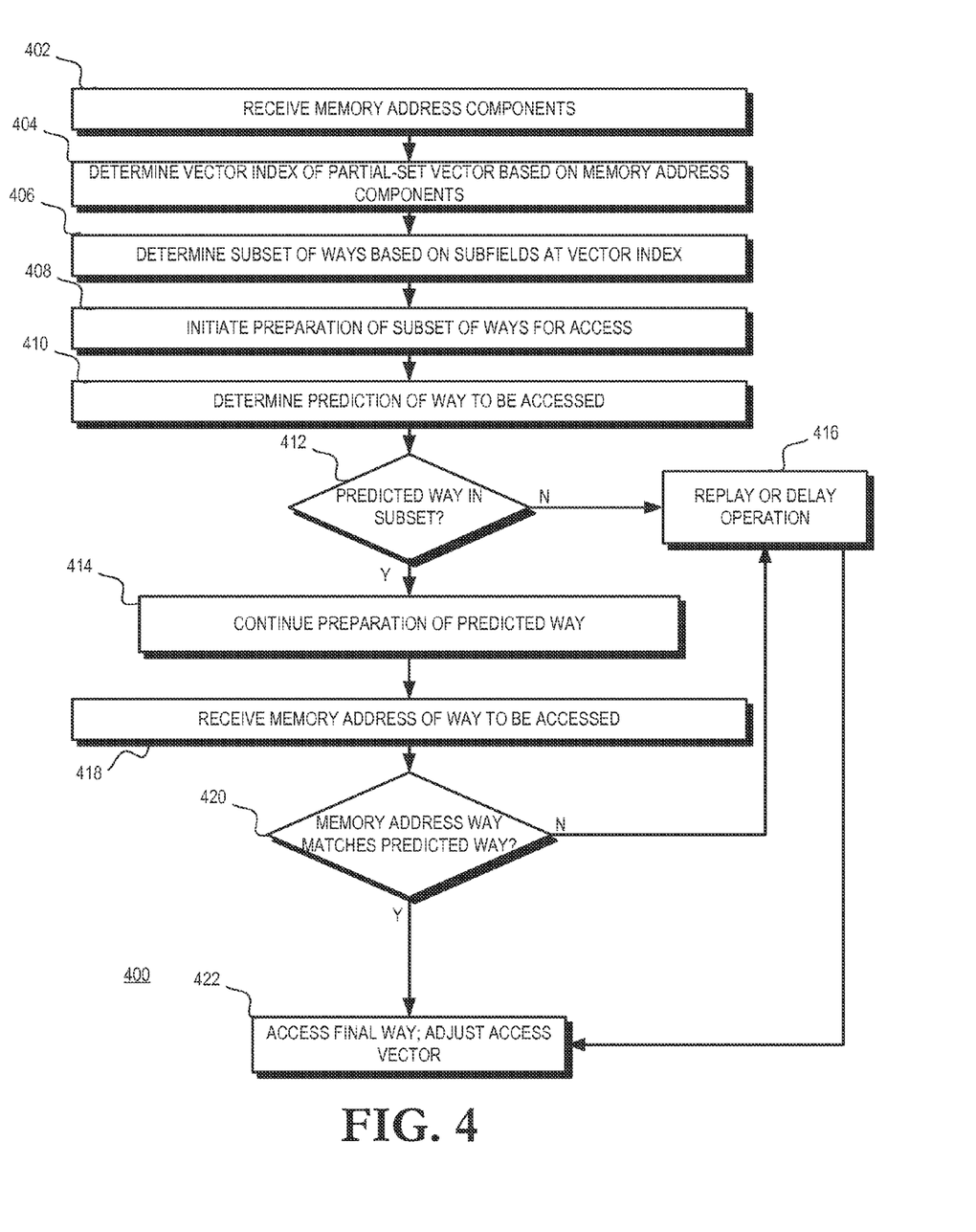
FIG. 4 is a flow diagram of a method of preparing a way of a cache for access in accordance with some embodiments.

FIG. 4 is a flow diagram of a method 400 of preparing a way of a cache for access in accordance with some embodiments. For ease of illustration, the method 400 is described with respect to an example implementation at the processor 100. At block 402 the AGU 104 and the partial set predictor 108 receive the memory address components from the load/store scheduler 110 for a memory access operation. At block 404 the partial set predictor 108 combines at least a portion of each of the memory address components to determine an index into a field containing the access vector 109. At block 406 the partial set predictor 108 determines, based on the values stored at the sub-fields of the indexed field, the subset of ways at the cache 102 that are predicted to include the way associated with the memory address. In response, at block 408 the controller 105 initiates preparation of the subset of ways for access.

At block 410 the way predictor 106 determines a prediction of the way to be accessed by the memory access. At block 412 the controller 105 determines if the predicted way is in the subset of ways predicted by the partial set predictor 108. If so, the method flow proceeds to block 414 and the controller 105 continues preparing the predicted way for access and stops preparation of the other ways in the subset. The method flow proceeds to block 418. If, at block 412, the controller 105 determines that the predicted way is not in the subset of ways predicted by the partial set predictor 108, the method flow moves to block 416 and the memory access operation is replayed or otherwise delayed at the instruction pipeline. When the operation is replayed, the subset of ways that were not selected at block 408 is prepared for access. In some embodiments, rather than replay the memory access operation, the operation is delayed at the load/store scheduler 110 until the other subset of ways can be prepared for access. In either scenario, access latency is increased relative to the method flow proceeding through block 414, where preparation of the predicted way was initiated earlier (at block 408). The method flow proceeds from block 416 to block 422 where the controller 105 accesses the way associated with the memory address. In addition, the partial set predictor 108 adjusts the value of the corresponding sub-field of the access vector 109 to reflect that the way was accessed.

At block 418 the AGU 104 determines the memory address based on the memory address components. In some embodiments, this determination is made prior to the way prediction at block 410. At block 420 the controller 105 determines if the way associated with the memory address matches the predicted way determined by the way predictor 106. If so, the method flow proceeds to block 422, described above. If the way associated with the memory address does not match the predicted way, the method flow proceeds to block 416 and the memory access is either replayed or delayed as described above.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
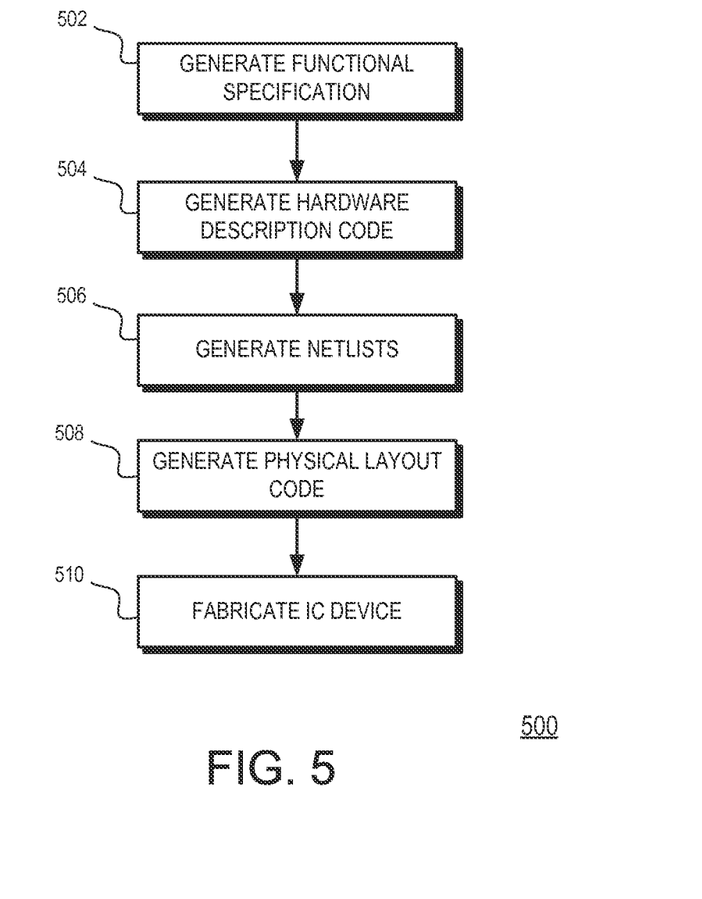
FIG. 5 is a flow diagram illustrating a method for designing and fabricating an integrated circuit device implementing at least a portion of a component of a processing system in accordance with some embodiments.

FIG. 5 is a flow diagram illustrating an example method 500 for the design and fabrication of an IC device implementing one or more embodiments. The code generated for each of the following processes is stored or otherwise embodied in computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored on a computer readable medium that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects.

As disclosed herein, in some embodiments a method of accessing a cache comprising a plurality of ways includes: storing access information for a first memory access indicating a subset of the plurality of ways, one of the subset accessed by the first memory access; in response to a second memory access to the plurality of ways: determining the subset of the plurality of ways based on the access information; and preparing the subset of the plurality of ways for access concurrent with determining a memory address based on the second memory access. In some aspects, the method includes concurrent with determining the plurality of ways, predicting a way of the plurality of ways accessed by the memory access based on memory address components of the memory address; and preparing the way of the plurality of ways for access concurrent with determining the memory address. In some aspects preparing the subset of the plurality of ways comprises precharging access lines of bit cells of the subset of the plurality of ways. In some aspects the bit cells store a plurality of tags associated with the subset of the plurality of ways. In some aspects storing the access information comprises determining a field of a vector based on the memory address; and adjusting a value stored at the field of the vector based on the first memory access. In some aspects storing the access information comprises determining the memory address associated with the first memory access; and adjusting the value stored at the field of the vector based on the memory address. In some aspects the field of the vector comprises a plurality of sub-fields, each of the plurality of sub-fields associated with a different corresponding subset of the plurality of ways.

In some embodiments a method of accessing a cache comprising a plurality of ways includes determining a memory address based on memory address components associated with a memory request; concurrent with determining the memory address, predicting based on the memory address components a selected way of the plurality of ways as the way to be accessed by the memory request and preparing the selected way for access based on the predicting; and concurrent with predicting the selected way, determining a subset of the plurality of ways based on the memory address and preparing the subset of the plurality of ways for access. In some aspects the method includes concurrent with predicting the selected way, determining a physical address for one of the plurality of ways based on the memory address components. In some aspects preparing the subset of the plurality of ways comprises precharging access lines of bit cells of the subset of the plurality of ways. In some aspects determining the subset comprises determining the subset based on a field of a vector and the method further includes: adjusting a value stored at the field of the vector based on accessing one of the subset of the plurality of ways. In some aspects the field of the vector comprises a plurality of sub-fields, each of the plurality of sub-fields associated with a different corresponding subset of the plurality of ways.

In some embodiments, a processor includes: a cache comprising a plurality of ways; a storage location to store a vector indicating a subset of the plurality of ways accessed by a first memory access; an address generation unit to determine a memory address in response to receiving a second memory access; a partial set predictor to, in response to the second memory access, determine the subset of the plurality of ways based on the vector; and a controller to prepare the subset of the plurality of ways for access concurrent with the address generation unit determining the memory address. In some aspects the processor includes a way predictor to, concurrent with the partial set predictor determining the subset, predict a way of the plurality of ways accessed by the memory access based on memory address components of the memory address. the controller is to prepare the subset of the plurality of ways by precharging access lines of bit cells of the subset of the plurality of ways. In some aspects the bit cells store a plurality of tags associated with the subset of the plurality of ways. In some aspects the partial set predictor is to adjust a value stored at a field of the vector based on the first memory access. In some aspects the partial set predictor is to determine the field of the vector based on a memory address associated with the first memory access. In some aspects the field of the vector comprises a plurality of sub-fields, each of the plurality of sub-fields associated with a different corresponding subset of the plurality of ways.

In some embodiments a computer readable medium stores code to adapt at least one computer system to perform a portion of a process to fabricate at least part of a processor, the processor including: a cache comprising a plurality of ways; a storage location to store a vector indicating a subset of the plurality of ways accessed by a first memory access; an address generation unit to determine a memory address in response to receiving a second memory access; a partial set predictor to, in response to the second memory access, determine the subset of the plurality of ways based on the vector; and a controller to prepare the subset of the plurality of ways for access concurrent with the address generation unit determining the memory address. In some aspects the processor further includes: a way predictor to, concurrent with the partial set predictor determining the subset, predict a way of the plurality of ways accessed by the memory access based on memory address components of the memory address. In some aspects the controller is to prepare the subset of the plurality of ways by precharging access lines of bit cells of the subset of the plurality of ways. In some aspects the bit cells store a plurality of tags associated with the subset of the plurality of ways. In some aspects the partial set predictor is to adjust a value stored at a field of the vector based on the first memory access. In some aspects the partial set predictor is to determine the field of the vector based on a memory address associated with the first memory access.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method of accessing a cache comprising a plurality of ways, the method comprising:
   storing access information for a first memory access indicating a subset of the plurality of ways, one of the subset accessed by the first memory access;
   in response to a second memory access to the plurality of ways, the second memory access received after the first memory access:
   initiating precharging all access lines for the plurality of ways;
   determining the subset of the plurality of ways based on the access information; and
   preparing the subset of the plurality of ways for access concurrent with determining a memory address based on the second memory access by precharging access lines of bit cells of the subset of the plurality of ways, wherein precharging comprises:
   completing precharging only for the subset of the plurality of ways; and
   stopping precharging access lines for ways of the plurality of ways not included in the subset.

2. The method of claim 1, further comprising:
   concurrent with determining the plurality of ways, predicting a way of the plurality of ways accessed by the memory access based on memory address components of the memory address; and
   preparing the way of the plurality of ways for access concurrent with determining the memory address.

3. The method of claim 1, wherein the bit cells store a plurality of tags associated with the subset of the plurality of ways.

4. The method of claim 1, wherein storing the access information comprises:
   determining a field of a vector based on the memory address; and
   adjusting a value stored at the field of the vector based on the first memory access, the value indicating how recently the subset of ways was accessed.

5. The method of claim 4, wherein storing the access information comprises:
   determining the memory address associated with the first memory access; and
   adjusting the value stored at the field of the vector based on the memory address.

6. The method of claim 4, wherein the field of the vector comprises a plurality of sub-fields, each of the plurality of sub-fields associated with a different corresponding subset of the plurality of ways.

7. A method of accessing a cache comprising a plurality of ways, comprising:
   determining a memory address based on memory address components associated with a memory request;
   in response to the memory request, initiating precharging access lines of bit cells for all of the plurality of ways;
   concurrent with determining the memory address, predicting based on the memory address components a selected way of the plurality of ways as a way to be accessed by the memory request and preparing the selected way for access based on the predicting; and
   concurrent with predicting the selected way, determining a subset of the plurality of ways based on the memory address and preparing the subset of the plurality of ways for access by continuing precharging access lines of bit cells of the subset of the plurality of ways, wherein precharging comprises precharging the access lines only for the subset of the plurality of ways and stopping precharging of access lines for ways of the plurality of ways not included in the subset.

8. The method of claim 7, further comprising:
   concurrent with predicting the selected way, determining a physical address for one of the plurality of ways based on the memory address components.

9. The method of claim 7, wherein determining the subset comprises determining the subset based on a field of a vector and further comprising:
   adjusting a value stored at the field of the vector based on accessing one of the subset of the plurality of ways.

10. The method of claim 9, wherein the field of the vector comprises a plurality of sub-fields, each of the plurality of sub-fields associated with a different corresponding subset of the plurality of ways.

11. A processor, comprising:
   a cache comprising a plurality of ways;
   a storage location to store a vector indicating a subset of the plurality of ways accessed by a first memory access;
   an address generation unit to determine a memory address in response to receiving a second memory access;
   a partial set predictor to, in response to the second memory access, determine the subset of the plurality of ways based on the vector; and
   a controller to prepare the subset of the plurality of ways for access concurrent with the address generation unit determining the memory address by initiating precharging access tines for ail of the plurality of ways, completing precharging the access lines only for the subset of the plurality of ways and stopping precharging of access lines for ways of the plurality of ways not included in the subset.

12. The processor of claim 11, further comprising:
   a way predictor to, concurrent with the partial set predictor determining the subset, predict a way of the plurality of ways accessed by the memory access based on memory address components of the memory address.

13. The processor of claim 11, wherein the bit cells coupled to the access lines store a plurality of tags associated with the subset of the plurality of ways.

14. The processor of claim 1, wherein the partial set predictor is to adjust a value stored at a field of the vector based on the first memory access.

15. The processor of claim 14, wherein the partial set predictor is to determine the field of the vector based on a memory address associated with the first memory access.

16. The processor of claim 15, wherein the field of the vector comprises a plurality of sub-fields, each of the plurality of sub-fields associated with a different corresponding subset of the plurality of ways.

17. A non-transitory computer readable medium storing code to adapt at least one computer system to perform a portion of a process to fabricate at least part of a processor, the processor comprising:
   a cache comprising a plurality of ways;
   a storage location to store a vector indicating a subset of the plurality of ways accessed by a first memory access;
   an address generation unit to determine a memory address in response to receiving a second memory access;
   a partial set predictor to, in response to the second memory access, determine the subset of the plurality of ways based on the vector; and
   a controller to prepare the subset of the plurality of ways for access concurrent with the address generation unit determining the memory address by initiating precharging access lines for all of the plurality of ways, completing precharging of access lines only for the subset of the plurality of ways and stopping precharging of access lines for ways of the plurality of ways not included in the subset.

18. The computer readable medium of claim 17, wherein the processor further comprises:
   a way predictor to, concurrent with the partial set predictor determining the subset, predict a way of the plurality of ways accessed by the memory access based on memory address components of the memory address.

19. The computer readable medium of claim 17, wherein the bit cells coupled to the access lines store a plurality of tags associated with the subset of the plurality of ways.

20. The computer readable medium of claim 17, wherein the partial set predictor is to adjust a value stored at a field of the vector based on the first memory access.

21. The computer readable medium of claim 20, wherein the partial set predictor is to determine the field of the vector based on a memory address associated with the first memory access.

22. The method of claim 5, further comprising:
   reducing the value stored at the field in response to memory accesses to subsets of the plurality of ways not associated with the field.

23. The method of claim 9, further comprising:
   reducing the value stored at the field in response to memory accesses to subsets of the plurality of ways not associated with the field.

24. The processor of claim 14, wherein the partial set predictor is to:
   reduce the value stored at the field in response to memory accesses to subsets of the plurality of ways not associated with the field.

25. The computer readable medium of claim 21, wherein the partial set predictor is to:
   reduce the value stored at the field in response to memory accesses to subsets of the plurality of ways not associated with the field.

* * * * *